(12) United States Patent
Johannesson

(10) Patent No.: US 11,254,018 B2
(45) Date of Patent: Feb. 22, 2022

(54) INDUSTRIAL ROBOT AND A DEVICE FOR TRANSFERRING MEDIA FROM THE ROBOT TO A TOOL

(71) Applicant: ROBOTAUTOMATION SVENSKA AB, Örebro (SE)

(72) Inventor: Morgan Johannesson, Kumla (SE)

(73) Assignee: Robotautomation Svenska AB, Örebro (SE)

(*) Notice: Subject to any disclaimer, the term of this patent is extended or adjusted under 35 U.S.C. 154(b) by 175 days.

(21) Appl. No.: 16/489,403

(22) PCT Filed: Feb. 6, 2018

(86) PCT No.: PCT/EP2018/052888
§ 371 (c)(1),
(2) Date: Aug. 28, 2019

(87) PCT Pub. No.: WO2018/162163
PCT Pub. Date: Sep. 13, 2018

(65) Prior Publication Data
US 2020/0009749 A1 Jan. 9, 2020

(30) Foreign Application Priority Data
Mar. 6, 2017 (SE) .................................. 1750250-1

(51) Int. Cl.
*B25J 19/00* (2006.01)
*B25J 17/00* (2006.01)
(Continued)

(52) U.S. Cl.
CPC ............ *B25J 19/0029* (2013.01); *B25J 9/06* (2013.01); *B25J 17/00* (2013.01); *H02G 11/00* (2013.01)

(58) Field of Classification Search
CPC .... B25J 19/0029; B25J 19/0041; B25J 17/02; Y10T 74/20311; H02G 11/00
See application file for complete search history.

(56) References Cited

U.S. PATENT DOCUMENTS

| | | | |
|---|---|---|---|
| 7,202,442 B2* | 4/2007 | Nakagiri | B25J 19/0029 |
| | | | 219/125.1 |
| 7,464,623 B2* | 12/2008 | Okada | B25J 19/0029 |
| | | | 74/490.05 |

(Continued)

FOREIGN PATENT DOCUMENTS

| | | |
|---|---|---|
| JP | S62-208888 A | 9/1987 |
| JP | S62-218092 A | 9/1987 |

(Continued)

*Primary Examiner* — Bobby Rushing, Jr.
(74) *Attorney, Agent, or Firm* — Dilworth & Barrese, LLP

(57) ABSTRACT

The present invention relates to a device for transferring media from an industrial robot to a tool, and an industrial robot including the device. The device comprises a swivel adapter (1) having a body (5) including a first coupling unit (7) arranged in one end of the body for coupling the swivel adapter to the robot, and second coupling unit (9) arranged in an opposite end of the body for coupling the swivel adapter to the tool, and a distance element (13) having a lower portion (15) attached to the first coupling unit and an upper portion (17) attached to the second coupling unit, wherein the first and second coupling units are spaced apart from each other along a common central axis (C1) so that a gap (11) is formed between them. The lower portion of the distance element is disposed at a distance the periphery of the first coupling unit, and the second coupling unit is provided with a penetration hole (19) in communication with the gap (11). The upper portion (17) of the distance element is arranged so that a space is formed between the upper portion of the distance element (13) and the first coupling unit (7). The penetration hole is formed between the distance element and the second coupling unit (9). The penetration hole is partly surrounding the distance element. The penetration hole extends an angle around the common central axis and in a curved direction around the distance element.

13 Claims, 6 Drawing Sheets

(51) Int. Cl.
    *H02G 11/00*    (2006.01)
    *B25J 9/06*     (2006.01)

(56) References Cited

U.S. PATENT DOCUMENTS

| | | | | |
|---|---|---|---|---|
| 7,631,573 B2* | 12/2009 | Kidooka | .............. | B25J 19/0025 |
| | | | | 74/490.02 |
| 7,836,789 B2* | 11/2010 | Haniya | ................ | B25J 19/0025 |
| | | | | 74/490.06 |
| 8,627,741 B2* | 1/2014 | Barkman | ............... | B25J 9/0009 |
| | | | | 74/490.04 |
| 8,629,350 B2* | 1/2014 | Ljungkvist | ............. | B25J 9/0009 |
| | | | | 174/72 A |
| 9,346,173 B2* | 5/2016 | Asano | ...................... | B25J 18/00 |

FOREIGN PATENT DOCUMENTS

| | | | | | |
|---|---|---|---|---|---|
| JP | 2004-050369 A | | 2/2004 | | |
| JP | 2011-115922 A | | 6/2011 | | |
| KR | 2016-0020694 A | | 2/2016 | | |
| WO | 2010/073568 A | | 7/2010 | | |
| WO | WO-2017128923 A1 * | | 8/2017 | .............. | B25J 19/00 |

\* cited by examiner

INDUSTRIAL ROBOT AND A DEVICE FOR TRANSFERRING MEDIA FROM THE ROBOT TO A TOOL

FIELD OF THE INVENTION

The present invention relates to a device for transferring media from an industrial robot to a tool. The present invention also relates to an industrial robot comprising a tool and a device for transferring media from the robot to the tool.

BACKGROUND OF THE INVENTION

In many robot applications there is a need to transfer media to a tool mounted on a robot during operation of the robot. Such media can be compressed air, water, electrical and data signals, and power. The media transfer is difficult due to the rotational movement of the tool in relation to the closest robot arm. It is well known to use devices called swivels for transferring power, air supply and electrical signals from the robot to the tool. A conventional swivel comprises a first part fixedly connected to an arm of the robot rotatable about axis 5. A second part fixedly connected to a tool holder of the robot mounted on axis 6. The first and second parts are rotatable relative each other and the media is slidingly transferred between the first and second parts, for example, by means of sliding contacts. Conventional swivels are able to transfer the media to the tool with robot motion capabilities fully maintained and allow the tool to be rotated unlimited number of turns in relation to the robot. This allows axis 6 of the robot to rotate freely without limitations by hoses, cables or other obstacles, and there are no limits to axes 4 and 5 either. However, a problem with this type of prior art swivels is the extensive wear on the contact surfaces between the first and the second parts due to the sliding motions, and consequently a need of periodic maintenance of the swivel. This may also cause reduced life time of the prior art swivels. Conventional swivels often have large heights, which may cause large torques on the outer axes of the robot. Another problem with conventional swivels is that they cannot transfer all types of mediums, e.g. electric cables, signal cables, and hoses for transferring fluids.

A solution to this problem is to limit the ability to freely rotate the tool in relation to the robot. In many applications a limited rotation is sufficient. KR20160020694 discloses an example of a swivel that has an elongated cylindrical body with a first part connected to an arm of the robot and a second part fixedly connected to the tool. The second part is hollow and has a first opening facing a direction perpendicular to a longitudinal axis of the body, and a second opening in a central portion of the cross-section of the second part and facing a direction opposite the first part. The swivel further comprises a bracket fixedly connected to a rotary ring, and the rotary ring surrounds the cylindrical body and is rotatably connected to the cylindrical body. An external tube comprising the media, which is to be transferred to the tool, passes through the bracket of the rotary ring and through the first and second opening and is connected to the tool. When the tool and body are rotated, the tube rotates the rotary ring and thus prevents the tube from entangling itself. The tube will possibly prevent the tool from further rotation. A problem with this solution is the height of the swivel, which may cause large torques on the outer axes of the robot. Another problem with this solution is that cables and hoses are positioned in the working area of the robot, and can be damaged by the robot during operation of the robot. This can also make it difficult to carry out a simulation of the robot since the position of the cables needs to be taken into account during the simulation.

JP2011115922 discloses a turning device for a robot. The turning device is rotatable and includes a crankshaft, having a turning plate connected to a turning part. The turning device also has a driving plate connected to a driving part for turnably driving a turning casing. The driving plate is connected to the turning plate at a distance by means of a column part disposed at the periphery of the turning plate and driving part so a gap is formed between the driving part and the turning plate. The turning plate has a through-hole in its center. A cable for transferring media is fed through the gap and the through-hole. A problem with this turning device is that upon rotation of the turning device, the column part will possibly obstruct the cable and thus prevent the turning device from rotating at larger angles. This could also damage the cable. Another problem is that the column part limits the movement of cables and hoses and thus the ability of the tool to rotate in relation to the robot is less than one turn, i.e. less than 360°. In many robot applications, there is a need to rotate the tool more than 360°. Another problem is that the column part decreases the stability of the turning device, and the turning device could easily be deformed.

OBJECT AND SUMMARY OF THE INVENTION

It is an object of the present invention to at least partly overcome the above problems.

This object is achieved by a device for transferring media from an industrial robot to a tool as defined herein.

The device comprises a swivel adapter having a body including a first coupling unit arranged in one end of the body for coupling the swivel adapter to the robot, a second coupling unit arranged in an opposite end of the body for coupling the swivel adapter to the tool, and a distance element having a lower portion attached to the first coupling unit and an upper portion attached to the second coupling unit. The first and second coupling units are spaced apart from each other along a common central axis so that a gap is formed between them for receiving one or more members for transferring media. The lower portion of the distance element is disposed at a distance from the periphery of the first coupling unit, and the second coupling unit is provided with a penetration hole in communication with the gap for receiving the one or more members from the gap and to guide the one or more members through the second coupling unit to the tool. The upper portion of the distance element is arranged so that a space is formed between the upper portion of the distance element and the first coupling unit, and the penetration hole is formed between the distance element and the second coupling unit, the penetration hole is partly surrounding the distance element, and the penetration hole extends an angle around the common central axis and in a curved direction around the distance element The members for transferring media are, for example, cables for transferring electrical signals, and power, hoses for transferring compressed air to the tool, and tubes for transferring liquid to the tool. The members are flexible. The swivel according to the invention has no sliding surfaces causing wear due to the sliding motions. This increases the life time of the swivel and reduces the need of maintenance. The invention allows the tool to be rotated relative the robot arm in a limited angle of rotation, without twisting the members around the robot arm. The members are only exposed to a pure rotary movement around their longitudinal axis. Thus, there is no bending movements of the members, which may cause damages to the hoses and cables.

Another advantage of the invention is that the members passes on the inside of the swivel adapter until they reach the tool, which prevents the members from being positioned in working area of the robots, and thereby prevents the members from being damaged by the robot. Also, simulation of the robot is facilitated, since the position of protruding members does not have to be considered. The members can be supplied from the robot to the gap of the swivel adapter in a relatively straight way.

Due to the fact that the members enter the gap between the coupling units at the periphery of the swivel adapter, and not at a central portion of the adapter, it is possible to reduce the distance between the first and second coupling units to achieve a compact device with reduced height.

The swivel adapter is a mechanical link between the robot and equipment, for example tools, mounted on the robot. The swivel adapter according to the invention is robust and mechanically stable. By arranging the distance element at a distance from the periphery of the first coupling unit, the swivel adapter becomes more stable compared to arranging the distance element at the periphery of the first and second coupling units. Further, the gap between the first and second coupling elements will entirely surround the lower portion of the distance element. Thus, the entrance to the swivel adapter is 360°, which allows the members to enter the swivel adapter from all possible directions.

The penetration hole is formed between the distance element and the second coupling unit and the penetration hole is partly surrounding the distance element. The penetration hole has an arcuate shape in order to surround the distance element. The penetration hole forms a curved opening between the distance element and the second coupling unit for receiving the members for transferring media to the tool. This enables the members for transferring media to move around the distance element from one end of the penetration hole to the opposite end of the penetration hole without being wounded around the distance element.

Further, the distance element is designed so that a space is formed between the upper portion of the distance element and the first coupling unit. The upper portion of the distance element is disposed at a distance from the first coupling unit, and the upper portion of the distance element has a lower surface facing the first coupling unit. The space formed between the upper portion of the distance element and the first coupling unit increases the space for the members to move freely in relation to the swivel adapter. The members are allowed to move into the space when the members are located in one of the ends of the penetration hole and the swivel adapter is still rotating. Thus, the swivel adapter is enabled to rotate beyond the angle in which the penetration hole extends around the distance element. The combination of the arcuate shape of the penetration hole and the space between the upper portion of the distance element and the first coupling unit makes it possible to move the members more than 360° around the distance element without wounding the members around the distance element. Accordingly, the invention allows the tool to be rotated relative the robot arm more than 360°, without twisting the members around the robot arm.

According to an embodiment of the invention, the penetration hole extends at least 240°, preferably at least 270°, and most preferably at least 290° extends around the common central axis. Having the penetration hole extending around the distance element at least 240° allows the tool plate of the robot to be rotated at least +/−200° in opposite directions, i.e. in total 400°, without winding the members around the distance element. Having the penetration hole extending around the distance element at least 290° allows the tool plate of the robot to be rotated at least +/−250° in opposite directions, i.e. in total 500°, without winding the members around the distance element.

According to an embodiment of the invention, the widths of the first and second coupling units are larger than the distance between the first and second coupling units. The width of the coupling unit is defined as the distance between two opposite parts of the periphery of the coupling unit. For example, if the coupling unit is circular, the width is the diameter of the coupling unit. If the coupling unit has polygonal shape, such as hexagonal, octagonal or square shape, the width is the distance between two opposite sides of the coupling unit. It the width of the coupling unit varies; the width is defined as the largest width of the coupling unit. Preferably, the width of the first and second coupling units are at least 50% larger than the distance between the first and second coupling units, more preferably, the width of the first and second coupling units are at least twice as large as the distance between the first and second coupling units, and most preferably at least three times as large as the distance between the first and second coupling units. This embodiment reduces the height of swivel adapter, and accordingly the distance between the tool plate and the tool is reduced.

According to an embodiment of the invention, the first and second coupling units are circular, and the diameters of the first and second coupling units are larger than the distance between the first and second coupling units.

According to an embodiment of the invention, the distance between the first and second coupling units along the common central axis is between 20 mm and 80 mm, and preferably between 30 mm and 60 mm. Thus, the distance between the tool and the tool plate of the robot is short, which reduces the torque on the axes of the robot, and enables the use of heavier tools. Due to the fact that the members enter the gap between the coupling units at the periphery of the swivel adapter, and not at a central portion of the adapter, it is possible to reduce the distance between the first and second coupling units to achieve a compact device with reduced height.

According to an embodiment of the invention, the width of the lower portion of the distance element at its narrowest point is less than half the width of the first coupling unit. Thus, the space for the members to move freely in relation to the swivel adapter is increased.

According to an embodiment of the invention, the lower portion of the distance element is rotational symmetric and has a circular cross-section. The shape of the first coupling unit is circular, and the diameter of the lower portion of the distance element at its narrowest point is less than half the diameter of the first coupling unit.

According to an embodiment of the invention, the lower portion of the distance element is disposed at a distance from the periphery of the first coupling unit corresponding to at least 20% of the width of the first coupling unit, preferably at a distance corresponding to at least 30% of the width of the first coupling unit. For example, the lower portion of the distance element is disposed at least 30 mm from the periphery of the first coupling unit, preferably at least 40 mm from the periphery of the first coupling unit, and most preferably at least 50 mm from the periphery of the first coupling unit. By increasing the distance between the distance element and the periphery of the first coupling unit, the space for the members to move freely in relation to the swivel adapter is increased. By moving the distance part away from the periphery of the first coupling member, the stability of the swivel adapter is increased. Further, by increasing the distance between the lower portion of the distance element and the periphery of the first coupling unit, the risk that the members are getting stuck in the lower portion of the distance element decreases.

According to an embodiment of the invention, the second coupling unit is annular. Further, the lower portion of the distance element is rotational symmetric. Thus, the contact surfaces between the members and the body of the swivel adapter are smooth, and sharp edges where the members can be stuck or be destroyed when the swivel adapter rotates are avoided.

According to an embodiment of the invention, the penetration hole has two opposite ends, and the shape of each of the opposite ends of the penetrating hole is circular. This design further increases the smoothness of the penetrating hole, thus preventing the members from getting stuck in the penetrating hole and reduces wear on the members during rotation of the swivel adapter.

According to an embodiment of the invention, the distance element is designed so that the lower portion of the distance element extends in a direction in parallel with the common central axis, and the upper portion of the distance element extends between the lower portion of the distance element and the second coupling unit in a direction cross the common central axis. Due to the fact that the lower portion of the distance element extends in a direction in parallel with the common central axis, and the upper portion of the distance element extends in a direction cross the common central axis, the cables and hoses are allowed to move beneath the upper part of the distance element, thereby increasing the angle the tool can be rotated relative the robot arm, without twisting the members around the robot arm, and still keeping the stability of the swivel adapter.

According to an embodiment of the invention, the lower portion of the distance element is attached to a central portion of the first coupling unit. Preferably, the lower portion of the distance element is extending along the common centre axis. By having the distance element attached to a central portion of the first coupling unit, the stability of the device increases.

Preferably, the distance element is solid in order to further increase the stability of the device.

According to an embodiment of the invention, the distance element has a bevelled part having an angled surface sloping towards the lower portion of the distance element. The bevelled part is disposed between the upper and lower portion of the distance element. This increases the size of the penetration hole which further increases the space for the members to move freely in relation to the swivel adapter.

According to an embodiment of the invention, the device comprises an outer part at least partly surrounding the periphery of the swivel adapter, and comprising one or more attachment elements for attachment to the robot, and the outer part is provided with an opening in communication with said gap, and the swivel adapter is configured to rotate relative the outer part. The outer part is designed to create an opening and holder for the cables and hoses to enable them to move relative the swivel adapter.

According to an embodiment of the invention, the device comprises a support element having a bent guiding surface. The support element is rotatably connected to an upper surface of the second coupling unit and designed to guide the one or more members around the penetrating hole. The support element leads the members a more favourable way around the penetration hole by directing the members towards the opening, and thus prevents the members from getting stuck and allows further rotation by centring the members.

According to another aspect of the invention, the object is achieved by an industrial robot according to the description herein.

The industrial robot comprises a first arm part and a wrist part rotatably connected to the first arm part. The robot comprises a device according to the invention attached to the wrist part. For example, the wrist part comprises a rotatable tool plate, and the lower coupling unit is attached to the tool plate.

According to an embodiment of the invention, the wrist part is rotatable relative the arm part about at least two wrist axes, and the first coupling unit is locked to one of the wrist axes, for example the sixth axis, and the outer part of the device is locked to another of the wrist axis, for example the fifth axis. The swivel adapter is locked to the outermost axis, and the outer part of the device is locked to the next axis.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
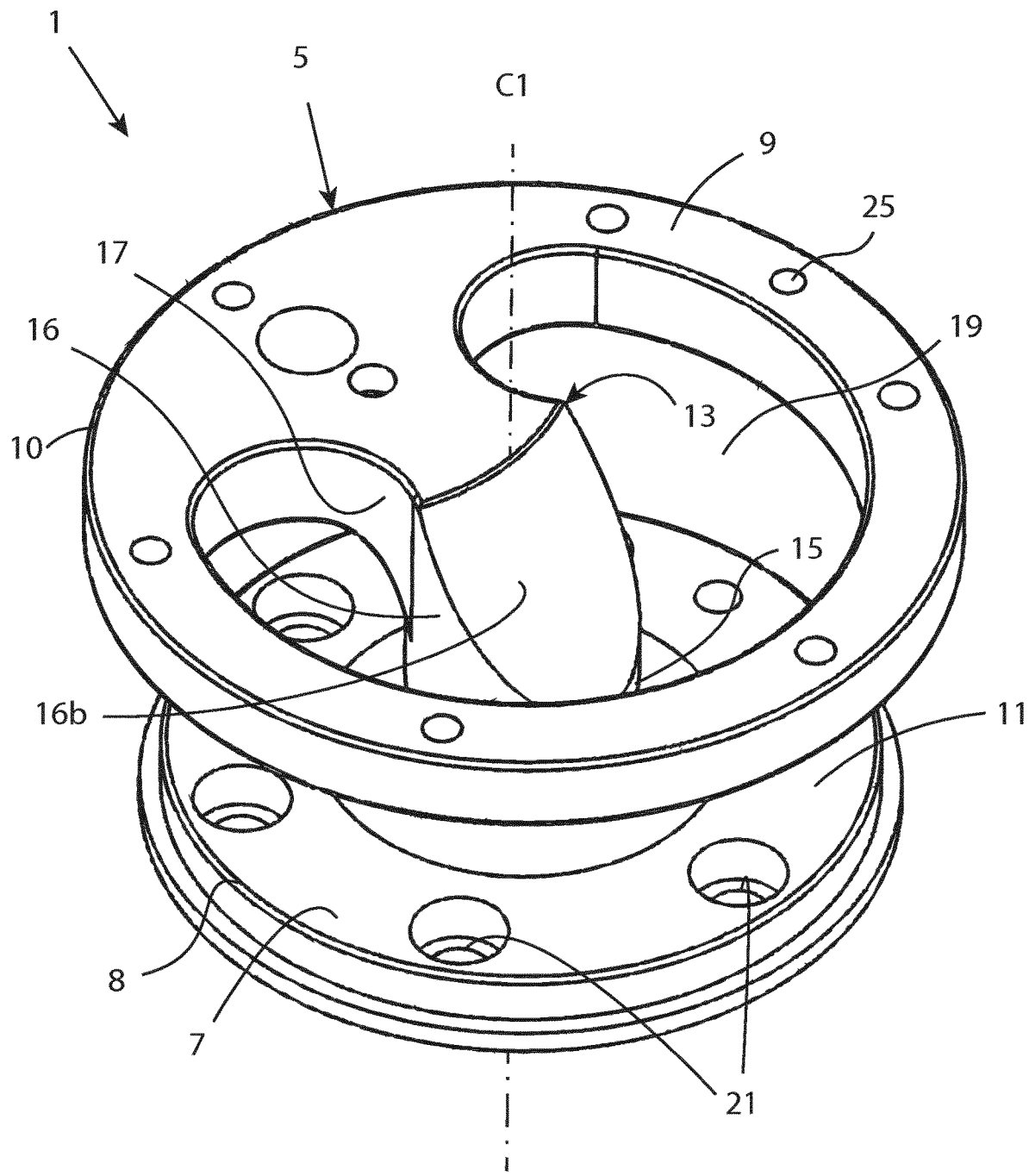
FIG. 1 shows a perspective seen from above of a first example of a swivel adapter of a device according to the invention.
Figure 2:
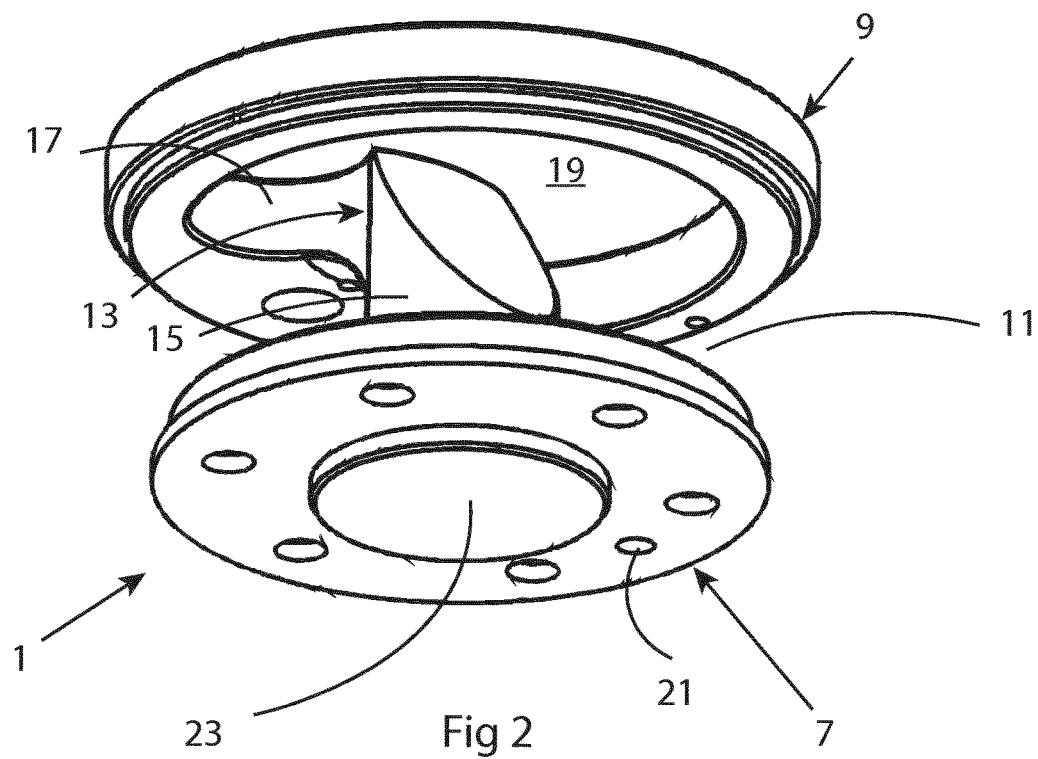
FIG. 2 shows a perspective seen from below of the swivel adapter shown in FIG. 1.
Figure 3:
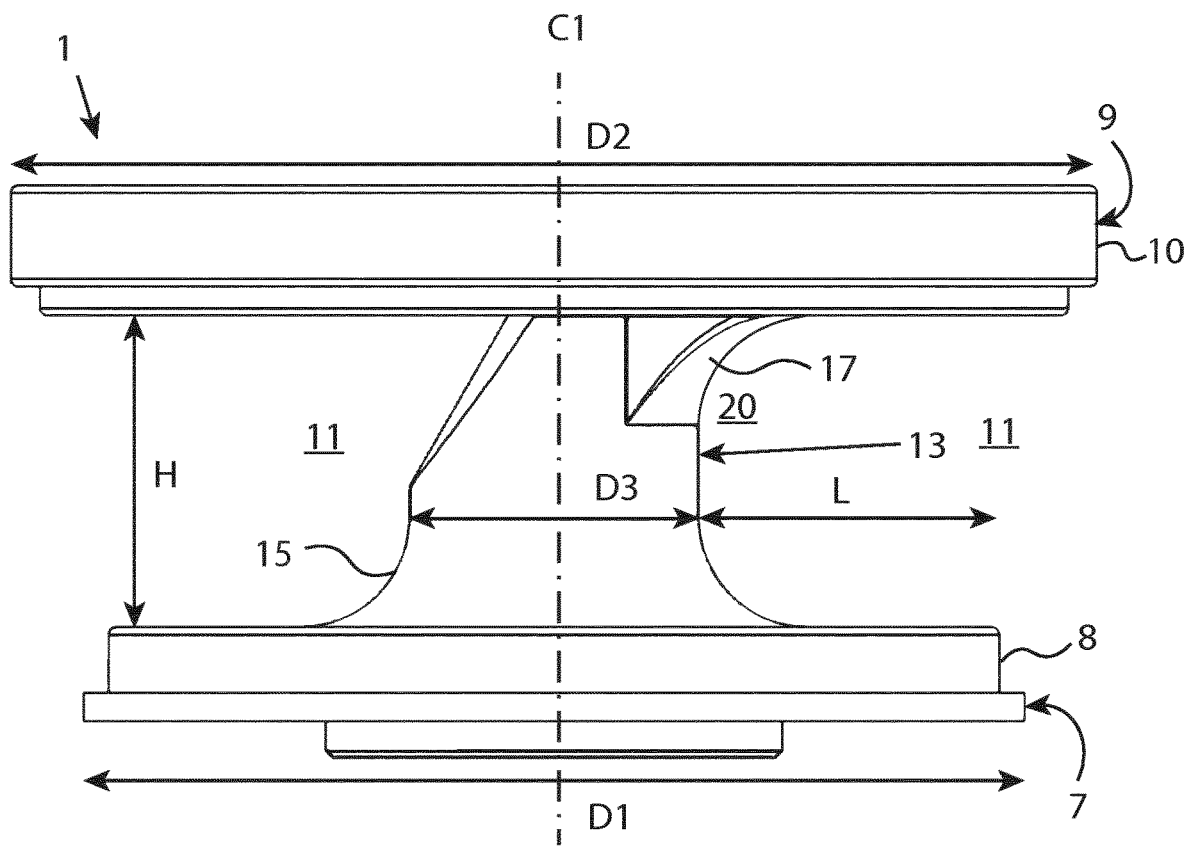
FIG. 3 shows a side view of the swivel adapter shown in FIG. 1.
Figure 4:
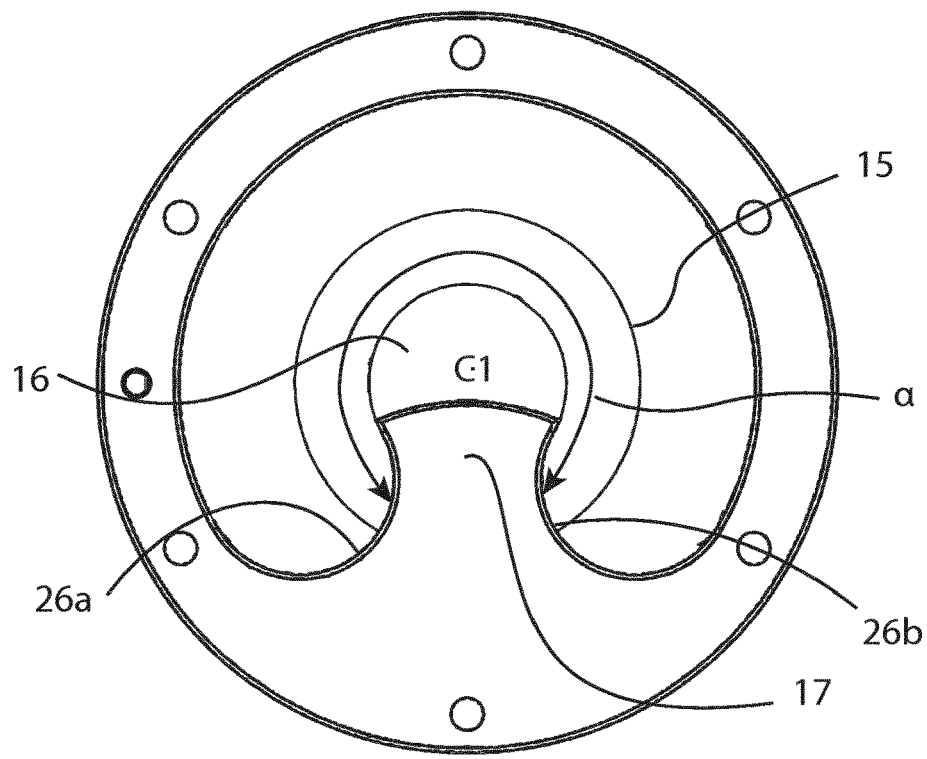
FIG. 4 shows a top view of the swivel adapter shown in FIG. 1.

An essential part of a device for transferring media from an industrial robot to a tool is a swivel adapter. FIG. 1 shows a first example of a swivel adapter 1 seen in a perspective view from above. FIG. 2 shows the swivel adapter 1 in a perspective view seen from below. FIG. 3 shows a side view of the swivel adapter 1, and FIG. 4 shows a top view of the swivel adapter 1. The swivel adapter 1 has a body 5 comprising a first coupling unit 7 adapted for coupling the swivel adapter 1 to a robot and arranged at a first end of the body 5, and a second coupling unit 9 adapted for coupling the swivel adapter 1 to a tool and arranged at an opposite end of the body 5. The second coupling unit 9 is spaced apart from the first coupling unit 7 at a distance H along a common central axis C1, as shown in FIG. 3. This allows a gap 11 to be formed between the first and the second coupling units 7, 9 for receiving one or more members for transferring media through the swivel adapter 1 to the tool. Thus, the inlet to the swivel adapter is through the gap 11 formed between the peripheries of the first and second coupling units. The gap 11 extends 360° around the central axis C1, and accordingly the inlet to the adapter is 360° around the central axis C1. The members can be a plurality of cables or tubes for transferring media from the robot to the tool.

The body 5 of the swivel adapter 1 further comprises a distance element 13 arranged between the first and the second coupling units 7, 9 for connecting the first coupling unit 7 to the second coupling unit 9. The distance element 13 is designed to keep the first and second coupling units 7, 9 spaced apart from each other along the common central axis and to take up mechanical force acting on the swivel adapter.

The distance element 13 has a lower portion 15 attached to the first coupling unit 7 at a distance L from the periphery 8 of the first coupling unit 7, as shown in FIG. 3. Preferably, the distance L between the narrowest part of the lower portion and the periphery of the first coupling unit is at least 30 mm, preferably at least 40 mm, and most preferably at least 50 mm.

In this embodiment, the lower portion 15 of the distance element 13 is attached to a central portion of the first coupling unit 7. The distance element 13 has an upper portion 17 attached to the second coupling unit 9. The upper portion 17 is disposed at a distance from the first coupling unit 7 in a direction towards the second end of the swivel adapter so that a space 20 is formed between the upper portion 17 of the distance element 13 and the first coupling unit 7, see FIG. 3.

The second coupling unit 9 comprises a penetration hole 19 in communication with the gap 11 for receiving the members from the gap 11 and to guide the members through the second coupling unit 9 to the tool. The penetration hole 19 is a through-hole in the second coupling unit 9. The penetration hole 19 is formed between the distance element 13 and the second coupling unit 9 and has an arcuate shape, see FIG. 4. The penetration hole 19 partly surrounds the distance element 13. The penetration hole 19 extends in a curved direction around the distance element 13, where the members are adapted to move. A part of the members can also move inside the space 20 between the upper portion 17 and the first coupling unit 7, allowing further rotation of the swivel adapter 1. The penetration hole 19 extends an angle α around the central axis C1, as shown in FIG. 4. The penetration hole 19 extends at least 240° degrees around the central axis C1. Preferably, the penetration hole 19 extends at least 270° degrees around the central axis C1, and most preferably the penetration hole 19 extends at least 290° degrees around the central axis C1. In this embodiment, the angle α is 290°, which allows the members to be rotated up to 540° around the second coupling unit 9.

Suitably, the body 5 is made in one piece. Preferably, the body 5 is made of metal, for example, stainless steel or aluminium. In this example, the second coupling unit 9 is shaped as a circular plate and has a circular periphery 10. However, the periphery of the second coupling unit 9 can have any shape, such as hexagonal, octagonal, elliptical, or square. Suitably, the second coupling unit 9 has a smooth surface. In this example, the first coupling unit 7 is shaped as a circular plate and has a circular periphery 8. However, the periphery of the first coupling unit 7 can have any shape, such as hexagonal, octagonal or elliptical. To avoid wear on the cables, sharp edges on the periphery of the first coupling unit 7 should be avoided. The first and second coupling units 7, 9 are arranged at a distance H from each other so that the gap 11 is formed between their peripheries for receiving members for transferring media to the tool. For example, the distance H between the first and second coupling units along the common central axis is between 20 mm and 80 mm, and preferably between 30 mm and 60 mm. The distance L may vary independently of the size of the robot. For example, L=30 mm for a small robot, L=40 mm for a medium sized robot, and L=60 mm for a large robot.

The distance element 13 is solid. The lower portion 15 of the distance element 13 is rotational symmetric with respect to the common central axis C1. In this embodiment, the lower portion 15 has a circular cross-section. However, in another embodiment, the lower portion 15 may have an elliptic cross-section. Thus, the diameter of the lower portion 15 varies. In another embodiment of the invention, the lower portion 15 can be cylindrical.

In this embodiment, the distance element 13 comprises a bevelled portion 16 having an angled surface 16b sloping towards the lower portion 15 of the distance element. This gives the bevelled portion a varying width along its extension. The lower portion 15 extends between the first coupling unit 7 and the bevelled portion 16. The bevelled portion 16 extends between the lower portion 15 and the upper portion 17 along the common central axis C1.

The upper portion 17 of the distance element extends between the bevelled portion 16 and the second coupling unit 9 in a direction cross the common central axis C1. In this embodiment, the upper portion 17 of the distance element is integrated with the second coupling unit 9, and a top surface of the upper portion 17 is arranged on the same level as a top surface of the second coupling unit 9 so that a continuous smooth surface is achieved. The upper portion 17 of the distance element 13 has two concave portions bending inwards towards a centre of the upper portion. The upper portion 17 of the distance element 13 is tapering towards its centre so that it is wider at its ends and thinner in the middle, thus increasing the angle of the penetration hole 19.

The first coupling unit 7 of the swivel adapter 1 comprises a plurality of first attachment means 21 and a connection plate 23 for attaching the swivel adapter 1 to a tool plate of a robot. The second coupling unit 9 of the swivel adapter 1 comprises second attachment means 25 for attaching the swivel adapter to a tool. In this embodiment the first and second attachment means are a plurality of screw holes for receiving screws or bolts.

In this example, the peripheries 8, 10 of the first and second coupling units 7, 9 are circular. Preferably, the diameters D1, D2 of the first and second coupling units are larger than the distance H between the first and second coupling units. Suitably, the diameters D1, D2 of the first and second coupling units are at least twice as large as the distance between the first and second coupling units, as shown in FIG. 3. Suitably, the diameter D3 of the lower portion 15 of the distance element, at its narrowest point, is less than half the diameter D1 of the first coupling unit 7.

Figure 5:
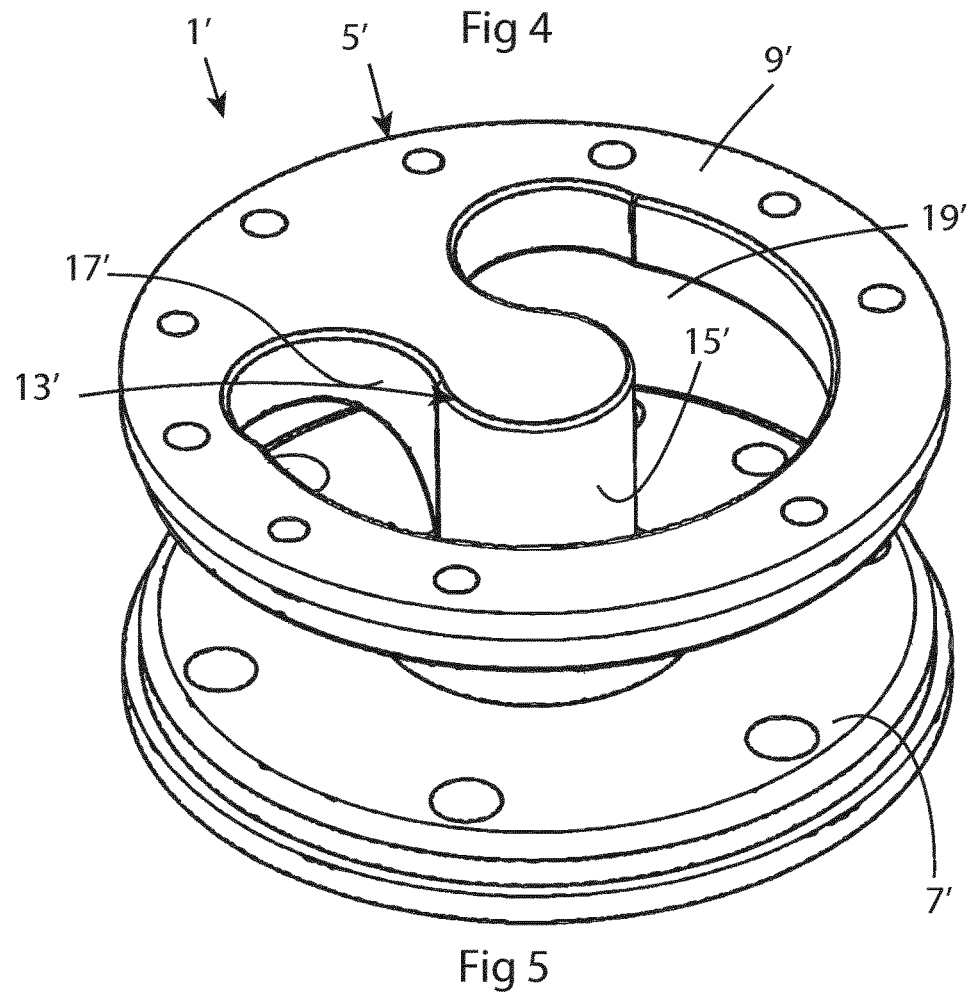
FIG. 5 shows a perspective seen from above of a second example of a swivel adapter of a device according to the invention.

FIG. 5 shows a perspective view seen from above of a second example of a swivel adapter 1' of a device according to the invention. In this embodiment the lower portion 15' of the distance element 13' is cylindrical, has a circular cross section, and extends along the common central axis C1, and is directly attached to the upper portion. The swivel adapter 1' has no bevelled portion.

Figure 6A:
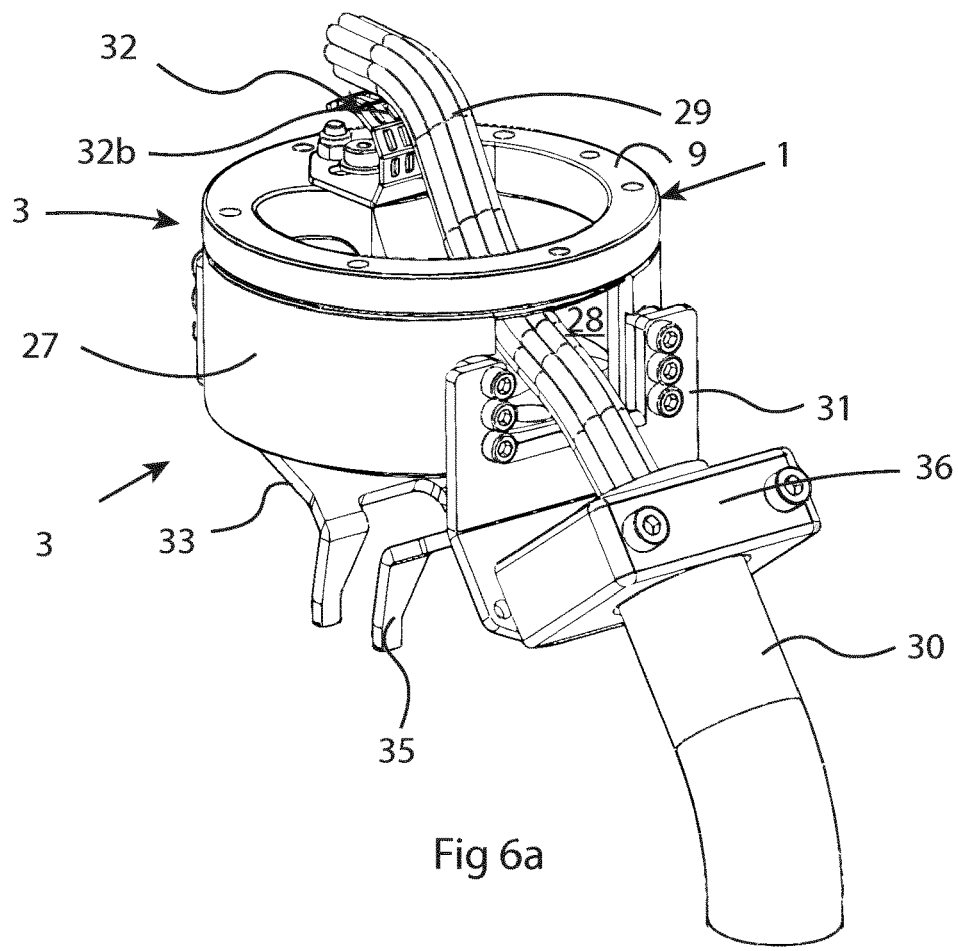
FIG. 6a shows an example of a device for transferring media from an industrial robot to a tool according to the invention seen from a rear perspective view.
Figure 6B:
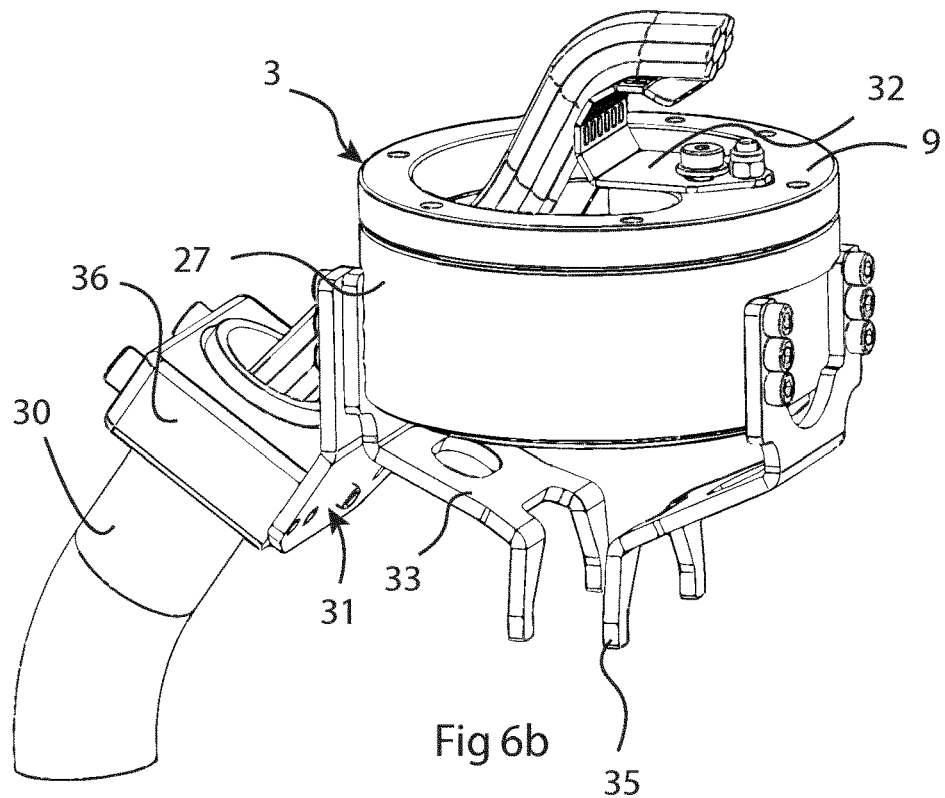
FIG. 6b shows the device with the swivel adapter as seen from side perspective view.

FIG. 6a shows an example of a device 3 for transferring media from an industrial robot to a tool according to the invention seen from a rear perspective view. FIG. 6b shows the device 3 seen from a side perspective view. The device 3 comprises the swivel adapter 1 and an outer part 27 that at least partly surrounds the swivel adapter. In this embodiment, the outer part 27 is cylindrical. The outer part 27 is, for example, made of plastic. The swivel adapter is disposed inside the outer part 27. The swivel adapter is arranged rotatable relative the outer part about the central axis C1. The outer part 27 has an opening 28 in communication with the gap 11 of the swivel adapter 1 so that the swivel adapter can receive members 29 for supplying media to the tool from the robot. The members 29 may include one or more cables for supplying power and data to the tool, and/or one or more hoses for supplying compressed air to the tool. The members 29 firstly enter the opening 28, then they pass through the gap 11 between the first and second coupling units 7, 9, and thereafter the members 29 pass through the penetration hole 19. The members are being supplied to the opening 28 by means of an outer tube 30 encasing the members. The outer tube 30 is attached to a cable holder 31 that is rigidly attached to the outer part 27.

The swivel adapter is fixedly connected to a tool plate of the robot. Thus, the swivel adapter is rotated when the tool plate is rotated. The outer part 27 is rigidly connected to an arm of the robot. Thus, the outer part 27 is prevented from rotating when the tool plate and the swivel adapter 1 is rotating. Due to the opening 28, the members 29 located in the opening 28 are prevented from rotating relative the outer part 27. Due to the gap 11 and the penetration hole 19, the swivel adapter is allowed to rotate relative the members 29 at least up to 360°, and preferably at least up to 400°, and most preferably at least up to 500°, without twisting the members 29 around the robot arm. The members 29 are exposed to a pure rotary movement.

In this embodiment, the device 3 comprises a support element 32. The support element 32 is rotatably connected to the second coupling unit 9 and has a curved part having a bent guiding surface 32b. The members 29 are attached to the bent guiding surface 32b of the curved part. The guiding surface 32b guides the members 29 from the swivel adapter 1 towards the tool. The support element 32 is at least partly rotatable around its own axis, and the rotation angle of the support element depends on in which angle the members 29 are protruding from the penetration hole 19. The support element 32 can guide the members 29 in different directions, depending on the connection point of the tool. In this embodiment the support element is rotatably attached to the second part in close proximity to the upper portion 17 of the distance element 13. The length of the members 29 inside the swivel adapter 1 can be adjusted to an extent, thus further increasing the possible rotation angle of the swivel adapter 1.

The outer part 27 is connected to the robot by means of attachment elements 33. The attachment elements 33 have one end connected to the outer part 27 and the other end connected to the robot. In this embodiment, two attachment elements 33 are connected to the outer part 27 by means of bolts, and to the robot by means of protruding parts 35. The protruding part 35 engages in recesses on the robot adapted to lock the protruding part 35 in the recesses. In other embodiments a different lock mechanism may be used, or different types or numbers of attachment elements 33. The cable holder 31 further comprises a holder part 36 for holding the members. The holder 36 is provided with an opening for receiving the outer tube 30 surrounding the members 29.

FIGS. 7a-d show examples of the passage of members 29 through the device 3 at different rotational angles of the swivel adapter 1 relative the cable holder 31 and the outer part 27. The position where the members 29 penetrate the penetration hole 19 is referred to as the current extension angle. The members 29 pass through the opening of the holder part 36 of the cable holder 31 and protrude from the outer tube 30. Then, the members 29 pass through the opening 28 of the outer part 27 and further pass through the gap 11 between the first and second coupling units 7, 9 of the swivel adapter. The members further pass through the penetration hole 19, and are attached to the guiding surface 32b of the support element 32. The support element 32 is attached to the second coupling unit 9. The support element 32 rotates relative the second coupling unit 9 and relative the outer tube 30. Depending on the position of the support element 32 relative the outer tube 30, different paths need to be taken for the members 29 to reach the support element 32. This means that upon rotation of the swivel adapter 1, a part of the members 29 has to curve in order to attach to the support element 32. Due to the fact that the support element is rotatable in relation to the swivel adapter, the members 29 will cause the support element to move to suitable direction for the members.

Figure 7A:
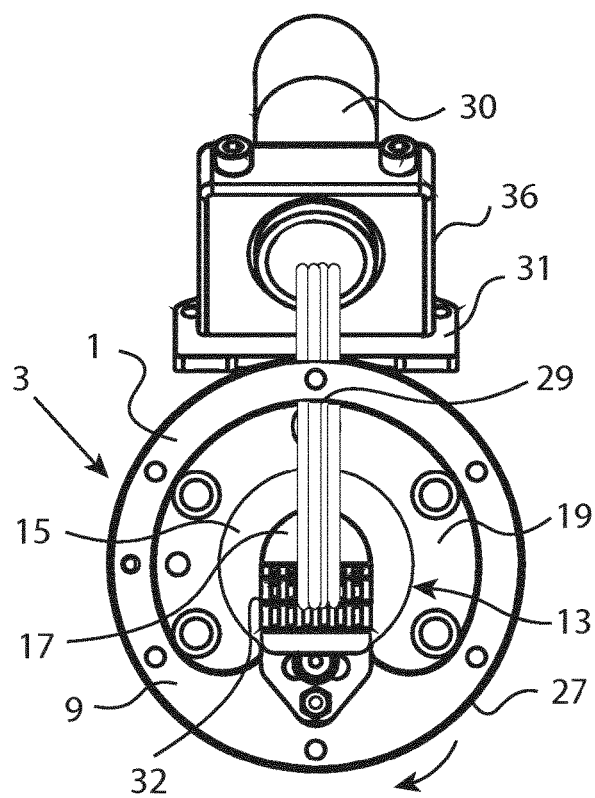
FIG. 7a-d shows the device and a cable at different rotational angles.

In FIG. 7a the swivel adapter 1 has a 0° rotational angle relative the cable holder 31. This means that the current extension angle is 0° and the support element 32 is at a far end of the second coupling unit 9 and faces the outer tube 30. Thus the members 29 can reach the support element without bending.

Figure 7B:
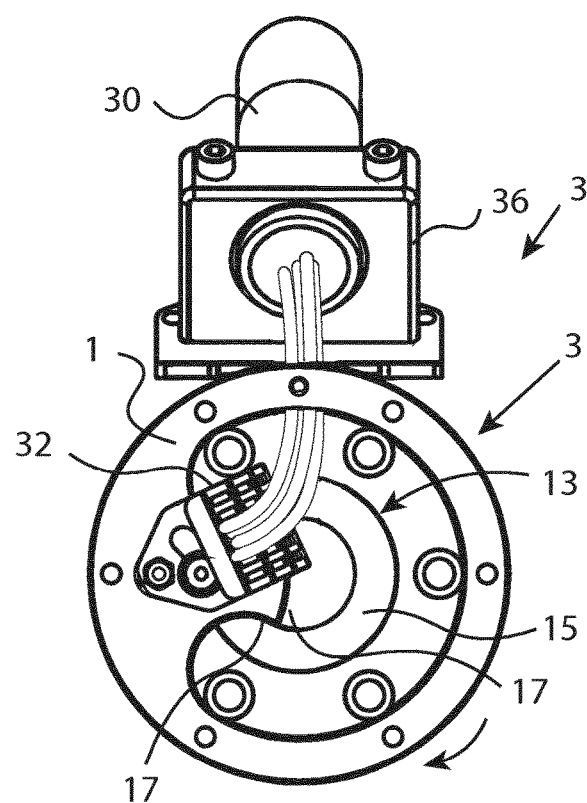

In FIG. 7b the swivel adapter 1 has a 90° rotational angle relative the cable holder 31. The current extension angle is about 90°. The members 29 are thus curved in order to reach the supporting member 32. The members 29 have rotated the support element so it faces the most suitable direction for the members.

Figure 7C:
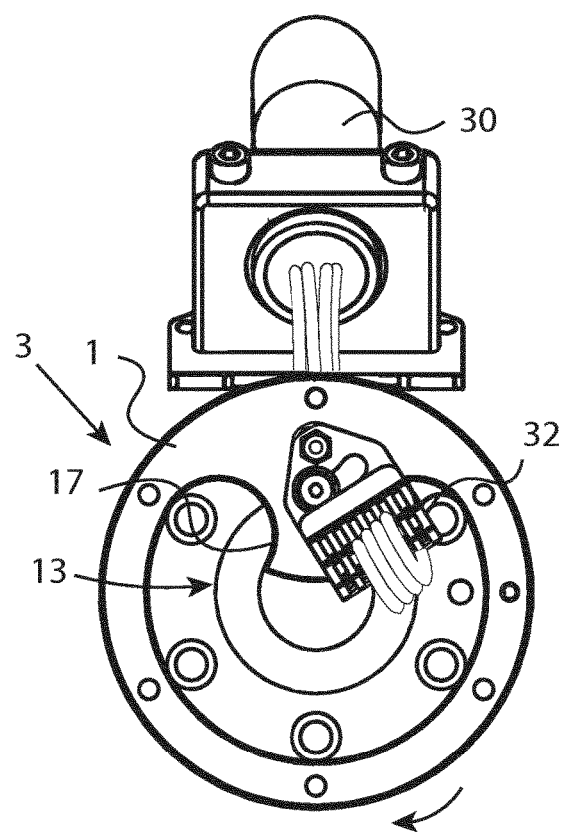

In FIG. 7c the swivel adapter has an 180° rotational angle relative the cable holder 31. The support element 32 holds the members at a distance from the second coupling unit 9 to prevent the members 29 to chafe against the surface of the second coupling unit 9. The current extension angle is thus affected by the length of the support element 32 and will remain in the same extension angle upon further rotation. A part of the members 29 moves through the space between the upper portion 17 of the distance element 13 and the first coupling unit 7, thus preventing the members 29 from entangling themselves in the swivel adapter 1. In this embodiment, the extent on which further rotation is possible is determined by the length of the members 29. However, in other embodiments the extent in which further rotation is possible may be achieved by other means.

Figure 7D:
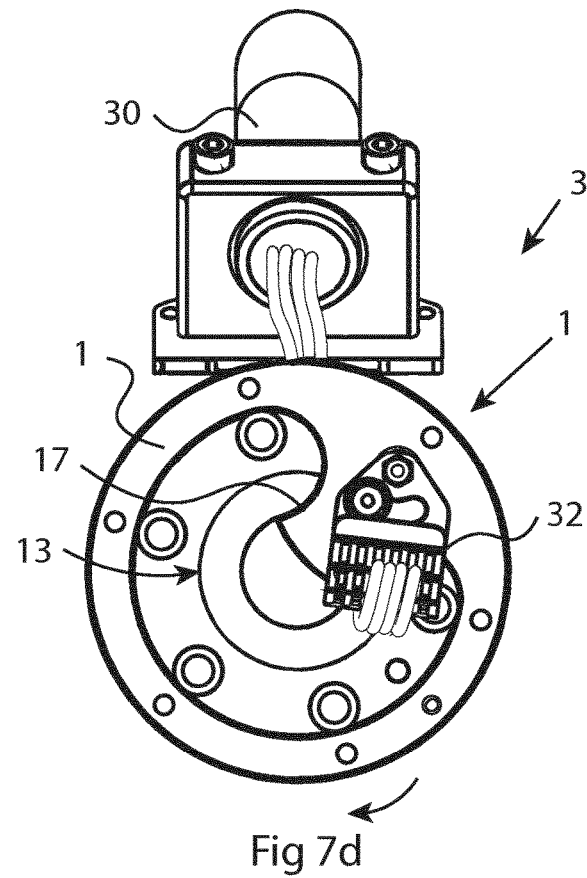

In FIG. 7d the swivel adapter has a 240° rotational angle relative the cable holder 31. The members 29 are fully extended at a 240° rotation. This example allows the swivel adapter a 240° rotation in both directions, thus giving the swivel adapter a total of 480° rotation. However, in another example, a further rotation of the swivel adapter to 270°, and a total of 540° rotation is possible.

The members 29 are standing still in relation to the robot during most of the rotation of the swivel adapter. The load on the members during the rotation of the swivel adapter is generally pure rotational which reduces the mechanical wear on the members and prolongs the life-time of the members.

Figure 8:
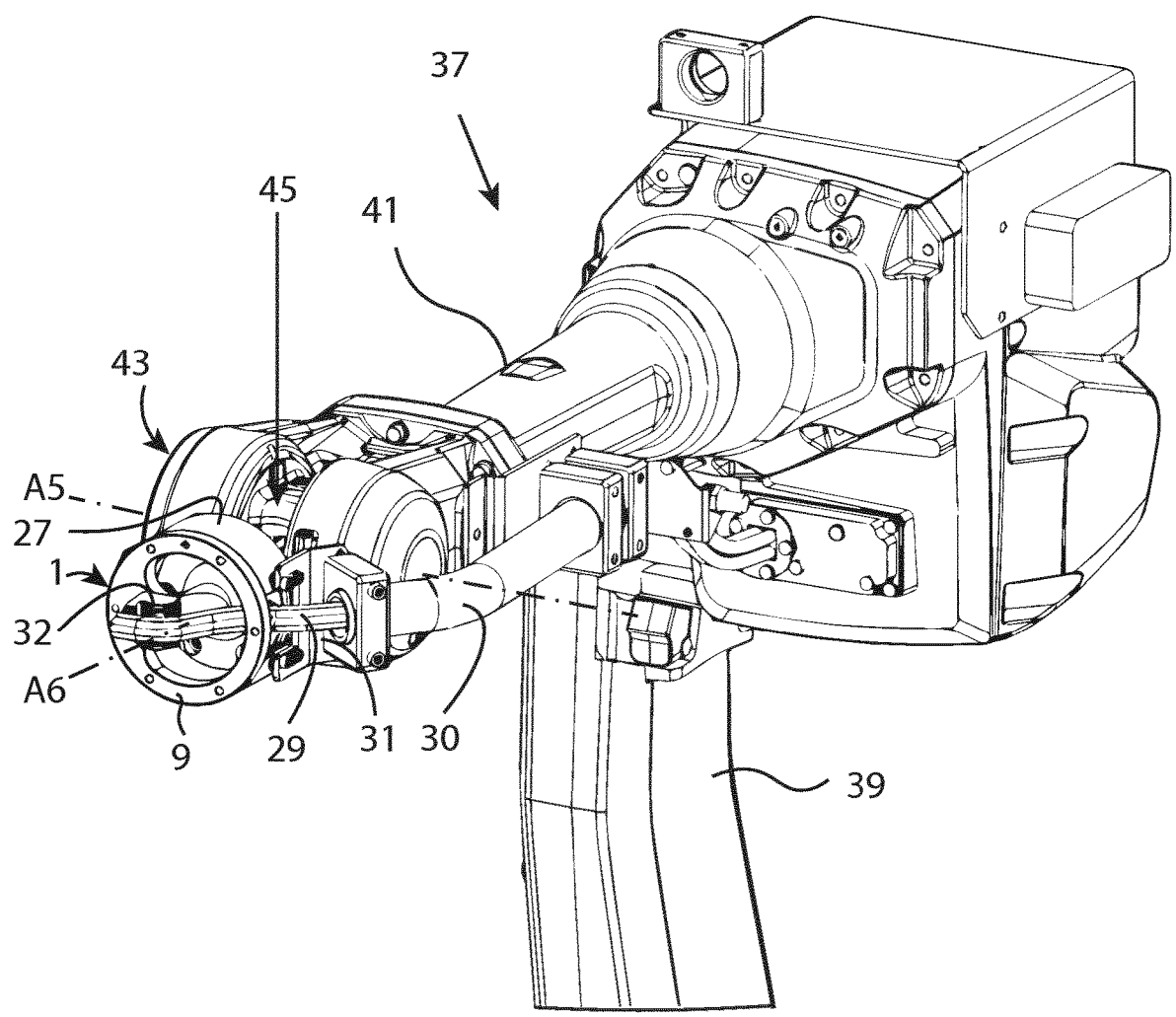
FIG. 8 shows a part of an industrial robot comprising the device in a perspective view.

FIG. 8 shows a part of an example of an industrial robot 37 comprising the device 3 seen from a perspective view. In this embodiment, the robot has six axes. However, the robot can have more or less than six axes. In this embodiment, the robot is a single armed robot. However, the robot can also be a dual armed robot. The robot 37 comprises a stationary base (not shown) that supports a stand (not shown), which is rotatable about a first axis. The stand supports a first arm part 39 which is rotatable about a second axis with respect to the stand. The first arm part 39 supports a second arm part 41 which is rotatable about a third axis with respect to the first arm part. The second arm part 41 supports a wrist part 43, which is rotatable about a fourth axis, a fifth axis A5, and a sixth axis A6 with respect to the second arm part. The wrist part 43 supports a tool. The first coupling unit 7 of the swivel adapter 1 is locked to the sixth axis of the robot so that the swivel adapter follows the movement of the sixth axis. The swivel adapter is the mechanical link between the robot and a tool mounted on the sixths axis of the robot. The wrist part may have a tool plate rotatable about the sixth axis. The first coupling unit 7 of the device 3 is then attached to the tool plate. Thus, the swivel adapter 1 rotates about the sixth axis.

The outer part 27 of the device is locked to the fifth axis of the robot, and thus follows the movements of the fifth axis. Due to the fact that the swivel adapter is locked to the sixth axis, the swivel adapter follows the movements of the fifth axis as well as the movements of the sixth axis. The outer part 27 stands still relative the sixth axis of the robot and relative the swivel adapter 1. For example, the wrist part comprises a shaft 45 defining the fifth axis, and the attachment elements 33 of the outer part 27 are attached to the shaft 45. The members 29 are guided to the device 3 by means of the outer tube 30. The members 29 follow the movements of the fifth and sixth axes. The present invention is not limited to the embodiments disclosed but may be varied and modified within the scope of the following claims. For example, the shape of the distance element and the penetration hole may vary. The size of the swivel adapter is adapted to the size of the robot or the tool. Thus, the swivel adapter can be scaled up or down in dependence on the size of the robot and/or tool.

The invention claimed is:

1. A device for transferring media from an industrial robot to a tool, wherein the device comprises a swivel adapter (1; 1') having a body (5) including:
   a first coupling unit (7;7') arranged in one end of the body for coupling the swivel adapter to the robot,
   a second coupling unit (9;9') arranged in an opposite end of the body for coupling the swivel adapter to the tool, and
   a distance element (13;13') extending between the first and second coupling units (7,9; 7',9') and having a lower portion (15; 15') attached to the first coupling unit (7;7') and an upper portion (17; 17') attached to the second coupling unit (9;9'), wherein
   the first and second coupling units (7,9;7',9') are spaced apart from each other along a common central axis (C1) so that a gap (11) is formed between them,
   the lower portion (15; 15') of the distance element (13; 13') is disposed at a distance (L) from a periphery of the first coupling unit (7;7'),
   the first coupling unit (7;7') is shaped as a circular plate and has a circular periphery (8),
   the upper portion (17; 17') of the distance element is spaced apart from the periphery of the second coupling unit (9;9') so that a space (20) is formed between the upper portion of the distance element (13;13') and the first coupling unit (7;7'),
   the second coupling unit (9;9') is provided with a penetration hole (19; 19') in communication with the gap (11), having an arcuate shape, partly surrounding the distance element (13;13'), and extending at least 240° around the common central axis (C1) in a curved direction around the distance element (13; 13'),
   the device comprises an outer part (27) at least partly surrounding the swivel adapter (1; 1') and comprising one or more attachment elements (33) for attachment to the robot,
   the outer part (27) is provided with an opening (28) in communication with said gap (11), and
   the swivel adapter (1;1') is configured to rotate relative the outer part (27).

2. The device according to claim 1, wherein the penetration hole (19;19') extends at least 270°, and preferably at least 290° around the common central axis (C1).

3. The device according to claim 1, wherein a width (D1, D2) of the first and second coupling units (7,9; 7',9') is larger than a distance (H) between the first and second coupling units (7,9;7',9').

4. The device according to claim 3, wherein the width (D1, D2) of the first and second coupling units (7,9;7',9') are at least twice as large as the distance (H) between the first and second coupling units (7,9;7',9'), and preferably at least three times as large as the distance (H) between the first and second coupling units (7,9;7',9').

5. The device according to claim 1, wherein a distance (H) between the first and second coupling units (7,9;7',9') along the common central axis (C1) is between 20 mm and 80 mm, and preferably between 30 mm and 60 mm.

6. The device according to claim 1, wherein a width (D3) of the lower portion (15; 15') of the distance element (13;13') at its narrowest portion is less than half a width (D1) of the first coupling unit (7;7').

7. The device according to claim 1, wherein the lower portion (15; 15') of the distance element (13;13') is disposed a distance (L) of at least 30 mm, preferably at least 40 mm, and most preferably at least 50 mm from the periphery (8) of the first coupling unit (7;7').

8. The device according to claim 1, wherein the penetration hole (19;19') has two opposite ends (26a-b), and a shape of each of the opposite ends (26a-b) is circular.

9. The device according to claim 1, wherein the distance element (13;13') is designed so that the lower portion (15; 15') of the distance element (13; 13') extends in a direction in parallel with the common central axis (C1), and the upper portion (17; 17') of the distance element (13; 13') extends between the lower portion (15; 15') of the distance element (13;13') and the second coupling unit (9;9') in a direction cross the common central axis (C1).

10. The device according to claim 1, wherein the lower portion (15; 15') of the distance element (13;13') is attached to a central portion of the first coupling unit (7;7').

11. The device according to claim 1, wherein the distance element (13;13') comprises a bevelled portion (16) having an angled surface (16b) sloping towards the lower portion (15; 15') of the distance element (13; 13').

12. A device for transferring media from an industrial robot to a tool, wherein the device comprises a swivel adapter (1; 1') having a body (5) including:
    a first coupling unit (7;7') arranged in one end of the body for coupling the swivel adapter to the robot,
    a second coupling unit (9;9') arranged in an opposite end of the body for coupling the swivel adapter to the tool, and
    a distance element (13;13') extending between the first and second coupling units (7,9; 7',9') and having a lower portion (15; 15') attached to the first coupling unit (7;7') and an upper portion (17; 17') attached to the second coupling unit (9;9'), wherein the first and second coupling units (7,9;7',9') are spaced apart from each other along a common central axis (C1) so that a gap (11) is formed between them, the lower portion (15; 15') of the distance element (13; 13') is disposed at a distance (L) from a periphery (8) of the first coupling unit (7;7'), the first coupling unit (7;7') is shaped as a circular plate and has a circular periphery (8), the upper portion (17; 17') of the distance element is spaced apart from the periphery of the second coupling unit (9;9') so that a space (20) is formed between the upper portion of the distance element (13;13') and the first coupling unit (7;7'), the second coupling unit (9;9') is provided with a penetration hole (19; 19') in communication with the gap (11), having an arcuate shape, partly surrounding the distance element (13;13'), and extending at least 240° around the common central axis (C1) in a curved direction around the distance element (13; 13'), and the device comprises a support element (32) having a bent guiding surface (32*b*) and rotatably connected to the second coupling unit (9;9').

13. An industrial robot comprising an arm part (41), a wrist part (43) rotatably connected to the first arm part (41), and a device (3) attached to the wrist part (43) and comprising a swivel adapter (1; 1') having a body (5) including:

a first coupling unit (7;7') arranged in one end of the body for coupling the swivel adapter to the robot, a second coupling unit (9;9') arranged in an opposite end of the body for coupling the swivel adapter to the tool, and a distance element (13;13') extending between the first and second coupling units (7,9; 7',9') and having a lower portion (15; 15') attached to the first coupling unit (7;7') and an upper portion (17; 17') attached to the second coupling unit (9;9'), wherein the first and second coupling units (7,9;7',9') are spaced apart from each other along a common central axis (C1) so that a gap (11) is formed between them, the lower portion (15; 15') of the distance element (13; 13') is disposed at a distance (L) from a periphery (8) of the first coupling unit (7;7'), the first coupling unit (7;7') is shaped as a circular plate and has a circular periphery (8), the upper portion (17; 17') of the distance element is spaced apart from the periphery of the second coupling unit (9;9') so that a space (20) is formed between the upper portion of the distance element (13;13') and the first coupling unit (7;7'), the second coupling unit (9;9') is provided with a penetration hole (19; 19') in communication with the gap (11), having an arcuate shape, partly surrounding the distance element (13;13'), and extending at least 240° around the common central axis (C1) in a curved direction around the distance element (13; 13'), and the device (3) comprises an outer part (27) at least partly surrounding the swivel adapter (1; 1') and comprising one or more attachment elements (33) for attachment to the robot, the outer part (27) is provided with an opening (28) in communication with said gap (11), the swivel adapter (1;1') is configured to rotate relative the outer part (27), the wrist part (43) is rotatable relative the arm part (41) about two wrist axes (A5, A6), and the first coupling unit (7;7') is locked to one of said wrist axes (A6) and the outer part (27) of the device (3) is locked to another of the wrist axes (A5).

\* \* \* \* \*